Figure 4:
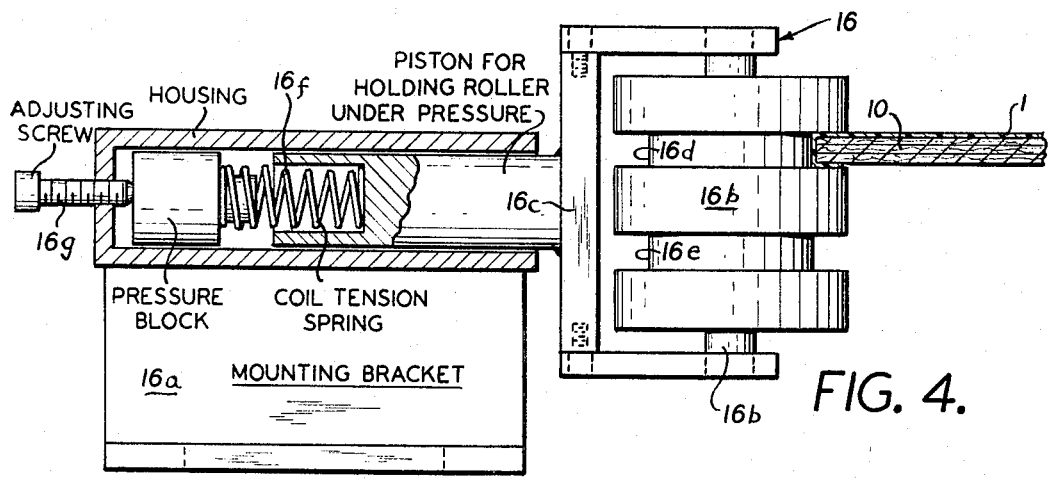

May 14, 1968 H. V. ETTORE ET AL 3,383,262
PANEL EDGE COVERING
Filed Oct. 4, 1962 2 Sheets-Sheet 1
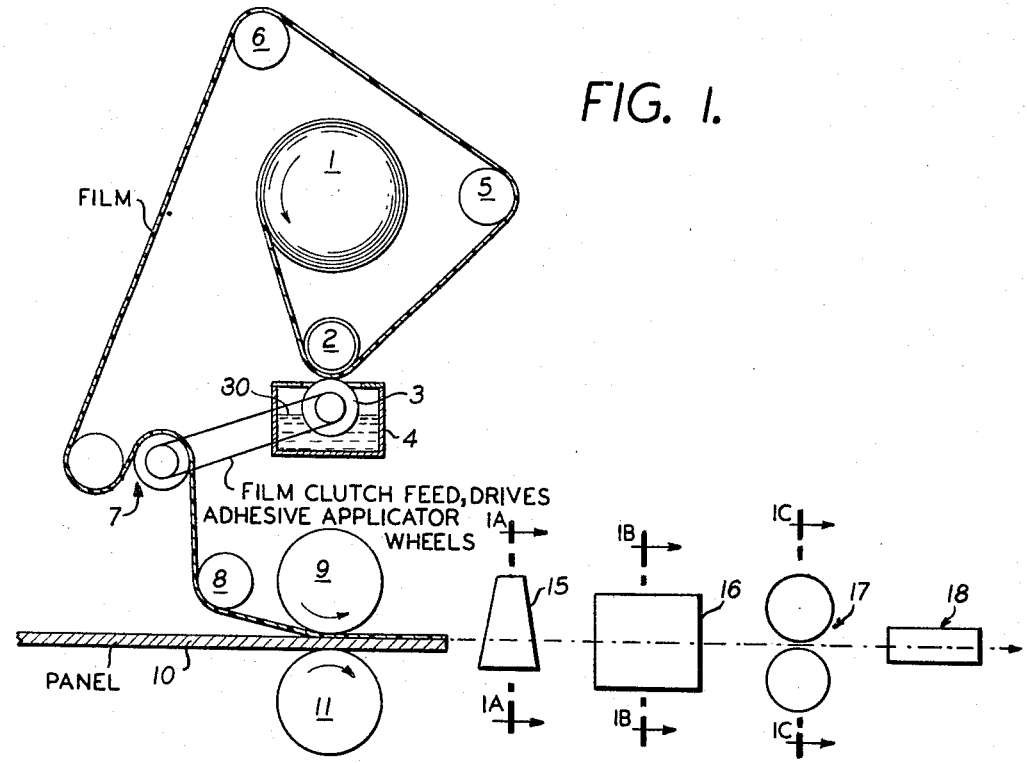
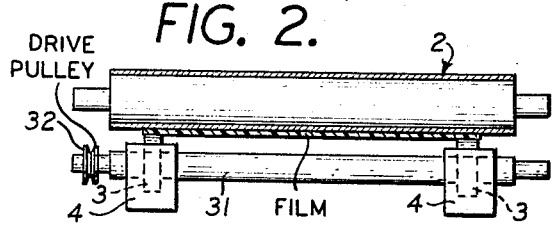
INVENTORS
HAROLD V. ETTORE
FREDERICK R. ASHBY
BY
*James F. Heilman*
ATTORNEY.

¹ United States Patent Office 3,383,262
Patented May 14, 1968

3,383,262
PANEL EDGE COVERING
Harold V. Ettore, Yorktown Heights, and Frederick R. Ashby, Lake Carmel, N.Y., assignors to U.S. Plywood-Champion Papers Inc., a corporation of New York
Filed Oct. 4, 1962, Ser. No. 228,478
9 Claims. (Cl. 156—216)

The present invention is concerned with an improved plastic on wood product. The invention is particularly concerned with a new decorative line of plywood paneling which is laminated with a film to produce high quality plywood panels adapted for use as interior and exterior wall panels, doors, furniture, such as coffee tables, end tables, conference tables, library tables and the like. The invention is particularly directed toward an improved method and apparatus for effectively and efficiently laminating the film to the plywood surface.

It is known in the art to use wood panels, particularly plywood panels for interior and exterior wall paneling, doors and furniture. However, in many instances, due to the nature of the use, these panels are subjected to weather, wear, stain and discoloration due to burning and other high temperature conditions. It has now been discovered that if a film such as a polyester film is laminated to the surface and particularly to the sides of the wood panel, such as a plywood panel, the laminated product is greatly improved with respect to its resistance to wear, to stain, to high temperature conditions and against other conditions to which it is exposed when used as, for example, resistance to moisture and water.

As pointed out heretofore, the invention is specifically concerned with an improved technique and apparatus of laminating the film to the board surface and especially to a technique of roll laminating and sealing in order to secure edge encapsulation of the panel edges with the film. By this latter technique, not only is the surface of the panel protected as hereinbefore described, but the edges are protected in order to provide a splinter-free edge. Generally, the particular technique comprises applying the adhesive to the edges of the film itself in an initial or simultaneous operation, coating the surface of the board with the adhesive and then applying the film which has been edge coated with adhesive to the surface of the panel followed by encasement of the edges or sides of the panel with the overlapping adhesive coated film.

The transparent or pigmented film may be of any type as, for example, a polyester type of film. The thickness of the film is varied appreciably as, for example, in the range from about .0001 to .01. A preferred thickness is in the range of about .003 inch. A particular type of satisfactory film is one manufactured by the Goodyear Film Products Company designated as Videne (polyester film) as described in the April 1962 issue of National Forest Products Week magazine. Other satisfactory films are Tedlar (polyvinyl fluoride film) as sold by E. I. du Pont de Nemours and Co., Inc. The adhesive may be any satisfactory type of adhesive designed to secure lamination of the film on the panel. The panel itself may be a solid board or metal but, as pointed out heretofore, is preferably a plywood panel containing from about 3 to 7 laminations and having a thickness in the range from about ¼ to ¾″ and higher.

By sealing the edges of the panel along the face of the panel with a transparent or pigmented plastic, the edges are sealed from moisture and a splinter-free edge is provided for handling by a carpenter or user. Also, when the edges are thus finished, the panel is excellent for doors, counters and the like. Furthermore, the edge sealing eliminates costly hand trimming operations of excess film without increasing the cost of the laminate. Also, by sealing the edge, a weather type edge is provided which enables the panels to be used in exterior occasions.

The process of the apparatus of the present invention may be readily understood by reference to the drawings illustrating the same.

Figure 5:
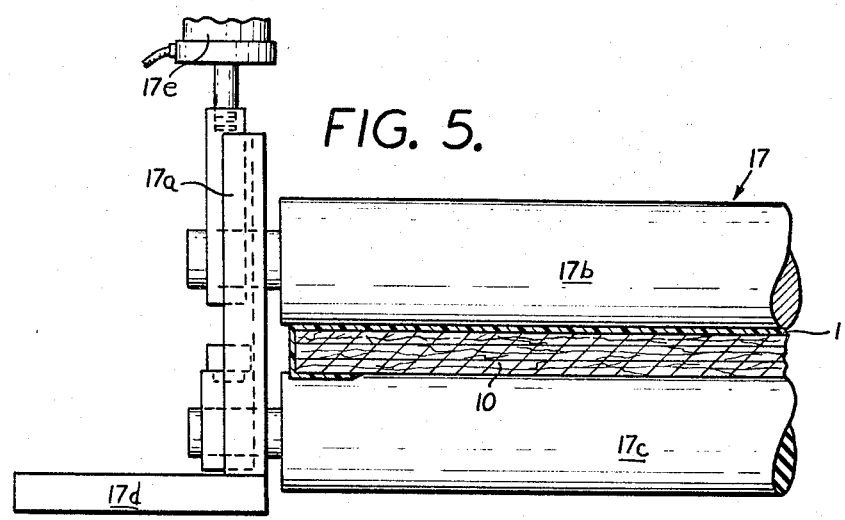
Figure 6:
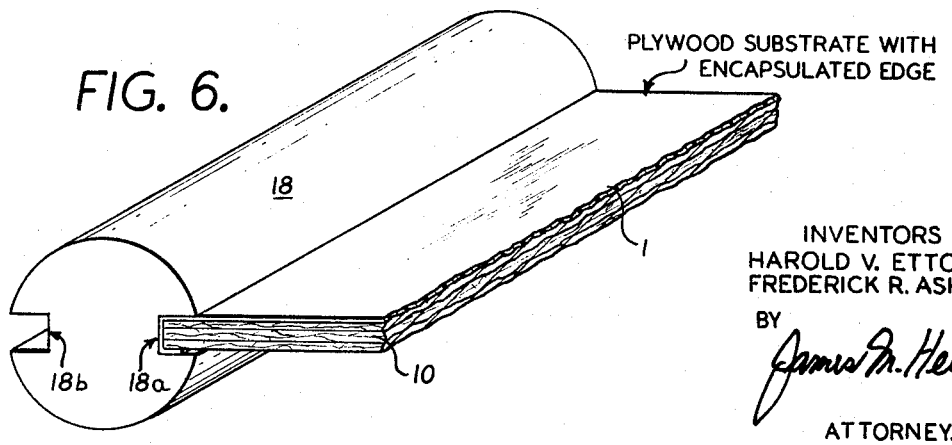

FIGURE 1 is a diagrammatical drawing illustrating one embodiment of the invention showing the stages and sequences of the operation. FIGURE 1A illustrates in some detail the drapes 15, FIGURE 1B illustrates the edge formers and FIGURE 1C the roll elements. FIGURE 2 is a front view of the edge applicators for the film and related elements. FIGURE 3 shows in some detail the drape assembly. FIGURE 4 illustrates the edge forming assembly, while FIGURE 5 shows details of the roll assembly. FIGURE 6 illustrates one adaptation of the wipers assembly.

Referring specifically to FIGURE 1, a roll of transparent or pigmented film 1 is passed between pressure roll 2 and adhesive applicator rolls 3 wherein the level of the adhesive is maintained at about level 30. These applicator rolls 3 are dipped in adhesive reservoirs 4. Pressure roll 2 is preferably of a mohair cover type, whereas the applicator rolls are rubber, silicone, aluminum or of other metal. The film coated with adhesive at the edges thereof is then passed over idler roll 5, idler roll 6 and around a clutch feed mechanism 7. The film then passes under idler roll 8 and is applied to the panel by means of silicone roll 9. The panel 10 is driven by means of power drive roll 11.

The width of the film cut and removed from roll 1 is greater than the width of the panel being coated by an amount equivalent to twice the thickness of the panel and the degree to which the film is wrapped or laminated on both undersides of the panel. Thus, the width of each applicator roll 3 should be about equivalent to the thickness of the panel plus the extent to which the film is laminated on the underside of the panel.

The panel is then moved through or by drape formers 15, edge formers 16, pressing rolls 17 and wiper elements 18. The drape formers function to press the overextending film downwardly along the sides of the panel as the panel moves thereby. The edge formers, preferably heated, function to press the edge of the film upwardly and laminate it to the desired extent on the underside of the panel. The steel rolls and heated wiper blades function to complete the lamination both on the top surface and the under surface of the panel.

Referring specifically to FIGURE 2, similar elements as shown on FIGURE 1 are similarly numbered. The film 1 passes beneath a pressure roll 2 preferably containing a mohair cover, which roll is suitably mounted to the frame. The applicator rolls 3 suitably mounted on axle 31 are rotated by means of pulley 32. These rolls dip into reservoir 4 and bear on the edges of the film in order to apply adhesive to the edges of the film as hereinbefore described. These applicator rolls 3 may be of any type but preferably are of aluminum or of brass.

FIGURE 1A is a front view of panel 10 passing between drape formers 15. These drape formers serve to seal the top of the film thoroughly on the edge of the panel and to press the film 1 along the sides of the panel. FIGURE 1B shows the panel 10 passing between edge formers 16 in a manner to bond the film to the edge and underside of the panel 10. FIGURE 1C shows the panel 10 passing between the roller 17. A preferred modification is to have the top roll of 17 to be a steel roll and the bottom roll to be a neoprene laminated roll.

FIGURE 3 illustrates in some further detail the drape formers 15. As the panel 10 passes thereby, the drape former can be adjusted so as to exert the desired pressure on the film by means of a slide adjustment 15a suitably mounted on adjustment bar 15b. A steel bracket 15c supports the assembly on a table top 15d. A brake or bar 15e prevents the drape from being thrust outwardly as the panel 10 moves thereby. One embodiment of the drape may comprise a groove type of leather bag containing, for example, 7 pounds of shot or other suitable amounts of weighting material such as compressed air or vacuum. The drape is a flexible type of material such as a brush, spring steel or plastic which will stand excessive wear.

Referring specifically to FIGURE 4, one suitable type of edge roller 16 is illustrated. The assembly comprises a mounting bracket 16a which may be welded to the housing or table. The roller 16b, which may be a silicone type of roll which is heated, rotates on axle 16b mounted in a fork mounting 16c as illustrated. Roller 16b contains recesses 16d and 16e. Thus, if the panel 10 passing by the roller assembly 16 comprises a 3/8" thick panel, groove 16d would be of a 3/8" width so as to permit the seating of the panel within the groove as illustrated. An auxiliary groove 16e is provided in the roller which may be rotated to be used if 16d should be subjected to excessive wear. If a 3/4" panel is being processed, then the depth or width of the grooves 16d would be sufficient to permit the rolling of the edge of the panel; namely, about 3/4". On the other hand, the depths of the respective grooves 16d and 16e could be varied. For example, the width of 16d could be of sufficient depth or width to permit the processing of a 3/8" panel while the groove 16e could be of sufficient width to permit the processing of a 3/4" panel. The desired tension of the roller 16b against the edge of the panel 10 is secured, for example, by means of a tension spring 16f within a housing which will exert the desired tension on the roll holder. The tension of spring 16f can be adjusted by means of adjusting screw 16g.

FIGURE 5 illustrates panel 10 passing between roll elements 17 which are suitably mounted on a bracket 17a. Top roll 17b may comprise a 3" polished steel roll, while the bottom roll 17c may comprise a neoprene or silicone roll and be about 2½" in diameter. These rolls are supported on a bracket or support 17d. The rolls may be kept under pressure by means of hydraulic cylinder 17e which is adjusted so as to secure the desired pressure or for release.

Referring specifically to FIGURE 6, a plywood panel 10 is shown passing through wiper elements 18. The specific wiper element illustrated comprises a cylindrical horizontal element containing a notched section 18a and 18b. The depth of 18a may be from ½" to 2" and the width is adjusted so as to wipe the desired plywood panel whether it be 1/8", 3/8", ½", 3/4" or of other dimensions. While the width of 18a and 18b may be identical, the grooves may be different so that 18a may wipe a ½" panel whereas 18b may wipe a panel of different thickness as, for example, a 3/4" panel. The configuration of these wiper elements also may be varied. They may comprise rectangular elements having the grooves of the correct dimensions as hereinbefore described. They may also assume other geometrical configurations.

While operating as described wherein the edges of the film are separately coated on the film, fouling of the guides through the dry ovens will not occur. Furthermore, fouling of the conveyor belts is avoided. Thus, when the adhesive is applied only to the film when needed, fouling of the guide is eliminated as well as fouling of the dry rolls, and the wet adhesive can be controlled very effectively.

Thus, in essence, the present invention comprises a process where a panel is placed on a conventional line and cleaned by sanding or other techniques. Generally, the laminating procedure comprises placing the wood substrate or panel on a conveyor manufacturing line. The panel surface is then cleaned by brushing with a Tampico brush and the dirt and dust and other foreign particles removed by suitable means such as by vacuum. The wet adhesive is then applied to the face of the wood substrate by a direct roll coat method. A curtain coater or reciprocating spray equipment may also be used.

The panel with the wet adhesive then passes through a drying tunnel to flash off the solvents from the adhesive. Generally, the panel leaves the oven dry to the touch. The panel with the dry adhesive passes under a heat bank which is composed for example of infra-red heaters. The heat reactivates the adhesive on the panel face to a point where it is tacky. As hereinbefore described, the film is let off the roll, the edges of the film are applied with adhesive and then the film is applied to the face of the panel, to the sides of the panel and to the under surface of the panel, preferably by heated silicone rolls. The heated roll transfers heat through the film to the tacky adhesive on the wood face. The heat affects a bond between the film and the wood, thus providing curing of the adhesive. Adhesive is applied to the edges of the film as described, and the film is then applied to the panel and the overlapping film edges laminated against the sides and to an extent underneath the panel.

What is claimed is:

1. Process for applying a film sheet to a flat supporting surface which comprises unwinding a continuous film sheet from a roll of film, passing said film sheet in contact with adhesive application means to apply adhesive solely along lateral marginal portions of said film sheet whereby the area of said film sheet between said lateral marginal portions is adhesive-free, applying adhesive to the upper face of said flat supporting surface, thereafter affixing the adhesive-free area of said film sheet to the upper adhesive coated face of said flat supporting surface, thereafter applying the lateral marginal portions of said film sheet to the sides and undersurface of said flat supporting surface.

2. Process as defined by claim 1 wherein said flat supporting surface comprises a plywood panel.

3. Process as defined by claim 1 wherein said application of said film is secured by first applying the lateral marginal portions of said film along the sides of said flat supporting surface, and thereafter applying the marginal portions of said film to the undersurface of said flat supporting surface.

4. Process for the manufacture of a film coated wood panel which comprises applying a mixture of solvent and adhesive to the upper face of a wood panel, then passing the adhesive coated panel through a drying tunnel at temperature conditions to flash off the solvent from the adhesive, then passing the dry adhesive under a bank of infrared heaters whereby the adhesive on the panel becomes tacky, unwinding a film from a film roll and coating the lateral marginal portions of said film in a manner that the area between said lateral marginal portions is adhesive-free, then applying the adhesive-free area of said film to the tacky adhesive on the face of said panel, thereafter applying the lateral marginal portions of said film to the sides of said panel and thereafter applying the lateral marginal portions of said film to the undersurface of said panel.

5. Apparatus for applying a plastic film to a plywood panel surface which comprises conveying means adapted to pass the panel along a processing line, means for applying a mixture of solvent and adhesive to the upper face of said panel, means for flashing off the solvent from said adhesive, infra-red means for rendering said adhesive tacky, roller means adapted to support a film, the width of said film is greater than the width of said panel, means for withdrawing said film from said roller means, means for applying adhesive solely to the lateral marginal portions of said film whereby the area between said lateral marginal portions is adhesive-free, means for affixing said portion of said film which is adhesive-free to the upper face of said panel containing said tacky adhesive, means for draping the lateral edges of said film along the sides of said panel, means for pressing the lateral marginal portions of said film against the sides of said panel and means for pressing the lateral marginal portions of said film along the undersurface of said panel.

6. Apparatus as defined by claim 5 wherein said means for draping the lateral marginal portions of said film along the sides of said panel comprises flexible bag elements which conform in a manner that a portion of said bag elements ride along the top surface of said panel and a portion of said bag elements press against the sides of said panel.

7. Apparatus as defined by claim 6 wherein means are provided for supporting said flexible bag at an angle of 90° across the direction of flow of said panel and said film.

8. Apparatus as defined by claim 5 wherein said means to apply said film to the undersurface of said panel comprises marginal edge formers which are characterized by having slots through which the panel and film pass, said slots being of sufficient diameter to just permit said film and said panel to pass therethrough.

9. Apparatus as defined by claim 6 wherein a slide means is provided to hold said bag members against the moving panel, said guide means having a slide adjustment so as to move the flexible bag the correct degree across the direction of flow of said panel, and wherein a brake means is provided below said guide means so as to prevent said flexible bags from moving more than a predetermined distance in the direction of flow of said panel.

References Cited
UNITED STATES PATENTS

| | | | |
|---|---|---|---|
| 2,154,134 | 4/1939 | Whelan | 156—216 |
| 2,822,575 | 2/1958 | Imbert et al. | 156—461 |
| 2,970,634 | 2/1961 | Hantscho | 156—216 |

FOREIGN PATENTS 216,750   8/1961   Austria.

ROBERT F. BURNETT, *Primary Examiner.*

EARL M. BERGERT, *Examiner.*

W. J. VAN BALEN, *Assistant Examiner.*